(12) United States Patent
Fukasaku et al.

(10) Patent No.: US 11,437,181 B2
(45) Date of Patent: Sep. 6, 2022

(54) MOTOR-DRIVEN COMPRESSOR

(71) Applicant: KABUSHIKI KAISHA TOYOTA JIDOSHOKKI, Kariya (JP)

(72) Inventors: Hiroshi Fukasaku, Kariya (JP); Shunsuke Ambo, Kariya (JP); Junya Kaida, Kariya (JP); Yoshiki Nagata, Kariya (JP); Takashi Kawashima, Kariya (JP); Kenji Hayakawa, Kariya (JP); Yoshikazu Hayashi, Kariya (JP); Atsushi Naito, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 351 days.

(21) Appl. No.: 16/829,503

(22) Filed: Mar. 25, 2020

(65) Prior Publication Data

US 2020/0312532 A1 Oct. 1, 2020

(30) Foreign Application Priority Data

Mar. 29, 2019 (JP) .............................. JP2019-067900

(51) Int. Cl.
*H01F 27/28* (2006.01)
*H02M 7/538* (2007.01)
(Continued)

(52) U.S. Cl.
CPC ......... *H01F 27/2876* (2013.01); *F04D 25/06* (2013.01); *H02K 11/33* (2016.01);
(Continued)

(58) Field of Classification Search
CPC ......... H01F 27/2876; H01F 2017/0093; H01F 17/06; H01F 27/22; H01F 37/00; H01F 27/306; H01F 27/323; F04D 25/06; H02K 11/33; H02M 1/12; H02M 7/53871; H02M 1/0064; H02M 1/123; H02M 1/327; H02M 1/126; H02M 7/003; H02M 7/5387; H02M 7/44; H02P 27/08; H02P 6/00; F04C 18/344; F04C 23/008; F04C 18/0215;
(Continued)

(56) References Cited

U.S. PATENT DOCUMENTS 5,546,065 A * 8/1996 Vinciarelli ............ H01F 27/346
336/212
6,151,228 A * 11/2000 Miyazaki .................. H02J 3/01
363/48
(Continued)

FOREIGN PATENT DOCUMENTS

CN 103254647 A 8/2013
CN 207039441 U 2/2018
(Continued)

*Primary Examiner* — Yusef A Ahmed
(74) *Attorney, Agent, or Firm* — Sughrue Mion, PLLC

(57) ABSTRACT

A metal film includes portions that are opposed to each other and located away from each other between the first winding and the second winding. The metal film includes the first linear part that is thermally coupled to a housing. The average value of electric resistance per unit length in the peripheral direction of the first linear part of the metal film is greater than an average value of electric resistance per unit length of locations other than the first linear part.

4 Claims, 7 Drawing Sheets

(51) Int. Cl.
*H02M 1/12* (2006.01)
*H02M 7/5387* (2007.01)
*H02P 27/08* (2006.01)
*H02K 11/33* (2016.01)
*F04D 25/06* (2006.01)
*H02M 1/00* (2006.01)

(52) U.S. Cl.
CPC ......... *H02M 1/12* (2013.01); *H02M 7/53871* (2013.01); *H02P 27/08* (2013.01); *H02M 1/0064* (2021.05); *H02M 1/123* (2021.05)

(58) Field of Classification Search
CPC .............. F04C 2240/40; F04C 29/0085; F04C 2240/808; F04B 35/04; F04B 39/06; F04B 39/121; F04B 39/0027; F04B 49/06; H05K 7/209
See application file for complete search history.

(56) References Cited

U.S. PATENT DOCUMENTS

| | | | | |
|---|---|---|---|---|
| 9,825,560 | B2* | 11/2017 | Li | H02M 1/4225 |
| 10,003,241 | B2* | 6/2018 | Naito | H02M 7/5387 |
| 2003/0079486 | A1* | 5/2003 | Kato | H02M 5/458 |
| | | | | 62/215 |
| 2008/0284367 | A1* | 11/2008 | Kawashima | H02M 1/126 |
| | | | | 318/700 |
| 2009/0140680 | A1* | 6/2009 | Park | H02P 23/26 |
| | | | | 318/438 |
| 2010/0014988 | A1* | 1/2010 | Tsutsui | H02M 7/003 |
| | | | | 417/44.1 |
| 2012/0141307 | A1* | 6/2012 | Kinoshita | F04C 23/008 |
| | | | | 417/410.1 |
| 2012/0237376 | A1* | 9/2012 | Kinoshita | F04B 39/121 |
| | | | | 417/423.7 |
| 2013/0033914 | A1* | 2/2013 | Yahata | H02M 7/48 |
| | | | | 363/132 |
| 2013/0049918 | A1* | 2/2013 | Fu | H01F 17/062 |
| | | | | 336/220 |
| 2013/0128643 | A1* | 5/2013 | Shinohara | H02M 7/537 |
| | | | | 363/131 |
| 2013/0224050 | A1* | 8/2013 | Nakagami | F04B 35/04 |
| | | | | 417/410.1 |
| 2014/0076434 | A1* | 3/2014 | Fukasaku | F04B 39/121 |
| | | | | 137/565.01 |
| 2014/0097928 | A1* | 4/2014 | Tomonari | H01F 1/047 |
| | | | | 336/207 |
| 2014/0183995 | A1* | 7/2014 | Saitou | F04B 35/04 |
| | | | | 310/72 |
| 2014/0306788 | A1* | 10/2014 | Umetani | H01F 27/385 |
| | | | | 336/173 |
| 2016/0254723 | A1* | 9/2016 | Suzuki | F25B 31/02 |
| | | | | 310/43 |
| 2017/0012506 | A1* | 1/2017 | Naito | H02M 1/14 |
| 2017/0104392 | A1* | 4/2017 | Mizuno | H02K 11/0141 |
| 2017/0274735 | A1* | 9/2017 | Kawasaki | B60L 50/50 |
| 2017/0288512 | A1* | 10/2017 | Kagawa | H02K 11/33 |
| 2017/0302217 | A1* | 10/2017 | Shinomoto | H02P 27/06 |
| 2018/0102723 | A1* | 4/2018 | Kawashima | H02P 21/22 |
| 2018/0123546 | A1* | 5/2018 | Kagawa | F04B 17/03 |
| 2018/0194200 | A1* | 7/2018 | Ambo | F04B 35/04 |
| 2018/0198350 | A1* | 7/2018 | Ambo | H03H 7/0115 |
| 2019/0089243 | A1* | 3/2019 | Naito | H02M 7/003 |
| 2019/0267890 | A1* | 8/2019 | Werker | H02M 1/126 |
| 2019/0301490 | A1* | 10/2019 | Ambo | F04B 35/04 |
| 2019/0305647 | A1* | 10/2019 | Ambo | B60H 1/3223 |
| 2019/0305648 | A1* | 10/2019 | Ambo | H01F 27/346 |
| 2019/0305708 | A1* | 10/2019 | Chretien | H02M 1/32 |
| 2020/0298654 | A1* | 9/2020 | Kagawa | B60H 1/00642 |
| 2020/0304051 | A1* | 9/2020 | Kouno | H02P 27/06 |
| 2020/0309107 | A1* | 10/2020 | Kinoshita | F04B 39/121 |
| 2020/0313504 | A1* | 10/2020 | Okochi | H02K 11/33 |
| 2020/0321836 | A1* | 10/2020 | Kagawa | H02K 11/02 |
| 2021/0088038 | A1* | 3/2021 | Fukasaku | H02M 7/219 |
| 2021/0090776 | A1* | 3/2021 | Fukasaku | F04D 25/0693 |
| 2021/0091699 | A1* | 3/2021 | Nagata | H01F 27/324 |
| 2021/0180578 | A1* | 6/2021 | Chida | F04B 53/14 |
| 2021/0231115 | A1* | 7/2021 | Naito | F04B 39/06 |
| 2021/0239106 | A1* | 8/2021 | Okochi | F04C 18/0215 |
| 2021/0301803 | A1* | 9/2021 | Ambo | H02K 11/02 |
| 2021/0305871 | A1* | 9/2021 | Yamakage | F04B 35/04 |
| 2021/0320566 | A1* | 10/2021 | Yamamoto | H02K 11/33 |

FOREIGN PATENT DOCUMENTS

| | | |
|---|---|---|
| CN | 109121458 A | 1/2019 |
| WO | 2012073423 A1 | 6/2012 |
| WO | 2017/170817 A1 | 10/2017 |

* cited by examiner

MOTOR-DRIVEN COMPRESSOR

BACKGROUND

1. Field

The following description relates to a motor-driven compressor.

2. Description of Related Art

International Patent Publication WO2017/170817 describes a motor-driven compressor including a common mode choke coil used for an inverter device that drives an electric motor. The common mode choke coil described in the publication is covered with a conductor to achieve the damping effect, by which a normal mode current through the conductor generates an induced current in the conductor, which is converted into thermal energy.

When the choke coil is covered with the conductor, heat is likely to be trapped inside. This requires a structure against heating. However, the conductor needs to have some electric resistance to have the damping effect. In this case, the conductor generates heat. This needs measures to efficiently transfer the heat of the conductor to a heat radiating member.

SUMMARY

It is an objective of the present invention to provide a motor-driven compressor with improved heat radiation performance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a motor-driven compressor is provided. The motor-driven compressor includes a compression portion that compresses fluid, an electric motor that drives the compression portion, an inverter device that drives the electric motor, and a metal housing that accommodates the inverter device. The inverter device includes an inverter circuit that converts direct-current power into alternating-current power, and a noise reducer arranged at an input side of the inverter circuit, in which the noise reducer reduces a common mode noise and a normal mode noise included in the direct-current power before delivered to the inverter circuit. The noise reducer includes a common mode choke coil, and a smoothing capacitor that forms a low pass filter circuit together with the common mode choke coil. The common mode choke coil includes a loop-shaped core, a first winding wound around the core, a second winding wound around the core, in which the second winding is located away from the first winding and opposed to the first winding, and a loop-shaped conductor that covers the core while extending over the first winding and the second winding. The conductor has portions that are opposed to each other and located away from each other between the first winding and the second winding, the conductor includes a heat radiation portion that is thermally coupled to the housing, and an average value of electric resistance per unit length in a peripheral direction of the heat radiation portion of the conductor is greater than an average value of electric resistance per unit length of locations other than the heat radiation portion.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

One embodiment of the present invention will now be described with reference to the drawings. An in-vehicle motor-driven compressor 11 of the present embodiment includes a compression portion that compresses fluid, which is refrigerant, and is used in an in-vehicle air conditioner 10. That is, the fluid compressed in the in-vehicle motor-driven compressor 11 is refrigerant.

Figure 1:
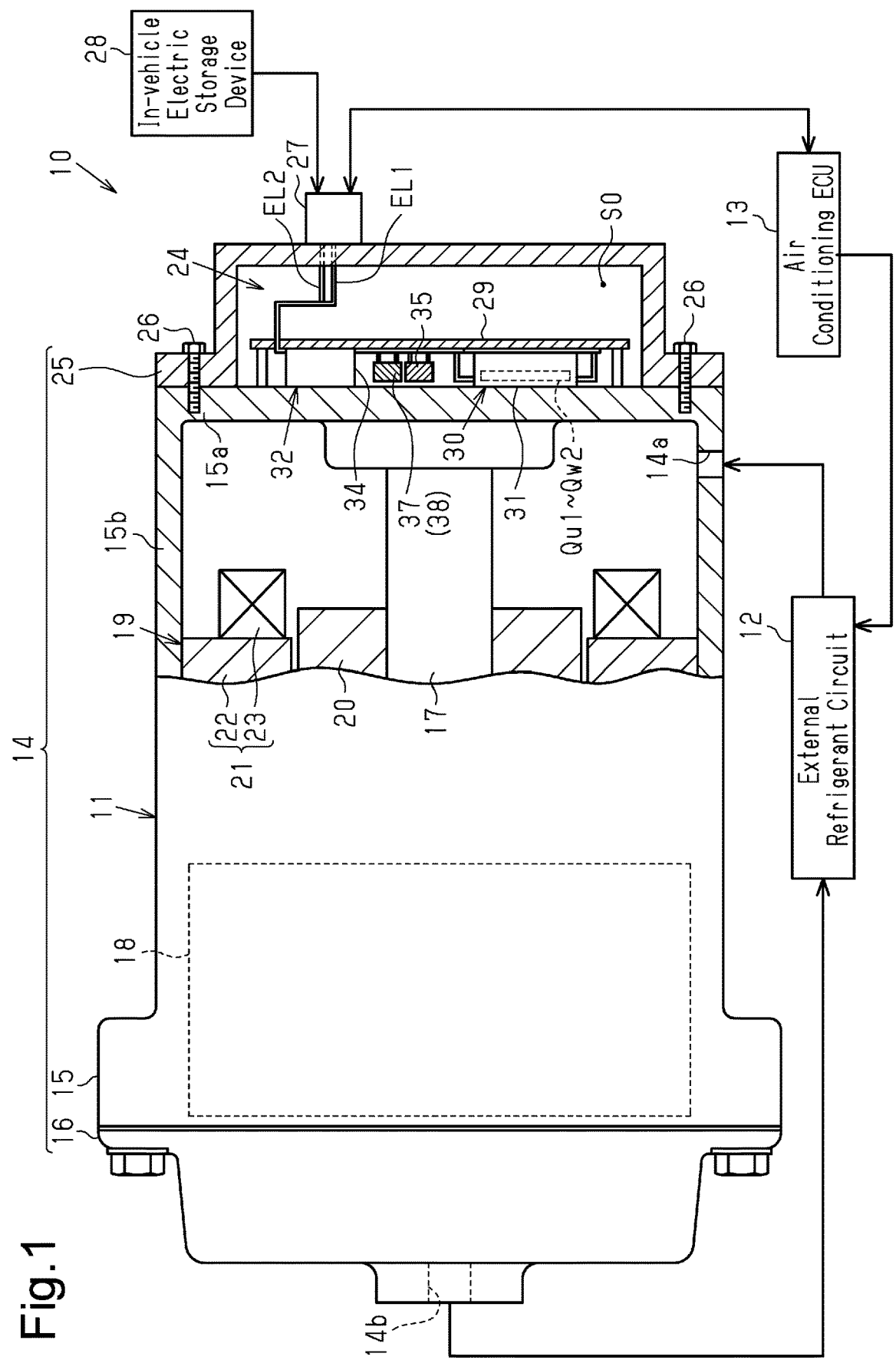
FIG. 1 is a schematic diagram showing an overall structure of an in-vehicle motor-driven compressor.

As shown in FIG. 1, the in-vehicle air conditioner 10 includes the in-vehicle motor-driven compressor 11 and an external refrigerant circuit 12 that supplies refrigerant to the in-vehicle motor-driven compressor 11. The external refrigerant circuit 12 includes a heat exchanger, an expansion valve, and the like. The in-vehicle motor-driven compressor 11 compresses refrigerant, and the external refrigerant circuit 12 performs heat exchange and expansion of the refrigerant. This cools or warms the passenger compartment.

The in-vehicle air conditioner 10 includes an air conditioning ECU 13, which controls the entire in-vehicle air conditioner 10. The air conditioning ECU 13 is configured to obtain parameters such as the temperature of the passenger compartment and a target temperature of the in-vehicle air conditioner 10. The air conditioning ECU 13 sends various types of commands such as an ON-OFF command to the in-vehicle motor-driven compressor 11 based on the parameters.

The in-vehicle motor-driven compressor 11 includes a housing 14 that has a suction port 14a through which refrigerant is drawn in from the external refrigerant circuit 12. The housing 14 is made of a thermally conductive metal material such as aluminum. The housing 14 is grounded to the body of the vehicle.

The housing 14 includes a suction housing member 15, a discharge housing member 16, and a cover member 25 that are integrally assembled with one another. The suction housing member 15 has a tubular shape with one end closed and the other end open. The suction housing member 15 has a plate-shaped bottom wall 15a and a tubular side wall 15b, which extends from the periphery of the bottom wall 15a toward the discharge housing member 16. The discharge housing member 16 is attached to the suction housing member 15 while closing the opening of the suction housing member 15. Accordingly, an internal space is defined in the housing 14.

The suction port 14a is provided in the side wall 15b of the suction housing member 15. Specifically, the suction port 14a is formed in a portion of the side wall 15b that is closer to the bottom wall 15a than to the discharge housing member 16.

The housing 14 has a discharge port 14b, through which refrigerant is discharged. The discharge port 14b is provided in a portion of the discharge housing member 16 that is opposed to the bottom wall 15a.

The in-vehicle motor-driven compressor 11 includes a rotary shaft 17, a compression portion 18, and an electric motor 19 accommodated in the housing 14. The rotary shaft 17 is rotationally supported by the housing 14. The axial direction of the rotary shaft 17 corresponds to the thickness direction of the bottom wall 15a that is, the axial direction of the side wall 15b. The rotary shaft 17 is coupled to the compression portion 18.

The compression portion 18 is located at a portion of the housing 14 that is closer to the discharge port 14b than to the suction port 14a (bottom wall 15a). When the rotary shaft 17 rotates, the compression portion 18 compresses refrigerant that has been drawn into the housing 14 through the suction port 14a and discharges the compressed refrigerant through the discharge port 14b. The compression portion 18 may be any type such as a scroll type, a piston type, and a vane type.

The electric motor 19 is arranged in the housing 14 between the compression portion 18 and the bottom wall 15a. The electric motor 19 drives the compression portion 18 by rotating the rotary shaft 17. The electric motor 19 includes a cylindrical rotor 20 fixed to the rotary shaft 17 and a stator 21 fixed to the housing 14. The stator 21 includes a cylindrical stator core 22 and coils 23 wound about the teeth of the stator core 22. The rotor 20 faces the stator 21 in the radial direction of the rotary shaft 17. When the coils 23 are supplied with currents, the rotor 20 and the rotary shaft 17 rotate. Accordingly, the compression portion 18 compresses refrigerant.

The in-vehicle motor-driven compressor 11 also includes a driving device 24, which drives the electric motor 19 and receives direct-current power, and a cover member 25, which defines an accommodation chamber S0 for accommodating the driving device 24.

The cover member 25 has a tubular shape with one end closed and the other end open toward the bottom wall 15a of the suction housing member 15. The cover member 25 is attached to the bottom wall 15a by bolts 26 with the open end abutting the bottom wall 15a. The opening of the cover member 25 is closed by the bottom wall 15a. The accommodation chamber S0 is defined by the cover member 25 and the bottom wall 15a.

The accommodation chamber S0 is included in the housing 14. The accommodation chamber S0 is located at the opposite side of the bottom wall 15a from the electric motor 19. The compression portion 18, the electric motor 19, and the driving device 24 are arranged in this order in the axial direction of the rotary shaft 17.

The cover member 25 includes a connector 27. The connector 27 is electrically connected to the driving device 24. Direct-current power is delivered, via the connector 27, to the driving device 24 from an in-vehicle electric storage device 28 mounted on the vehicle. The air conditioning ECU 13 and the driving device 24 are electrically connected to each other via the connector 27. The in-vehicle electric storage device 28 is a direct-current power supply mounted on the vehicle, which is, a rechargeable battery, a capacitor, or the like.

The driving device 24 includes a circuit board 29, an inverter device 30 arranged on the circuit board 29, and two connection lines EL1 and EL2. The connection lines EL1 and EL2 are used to electrically connect the connector 27 to the inverter device 30.

Figure 2:
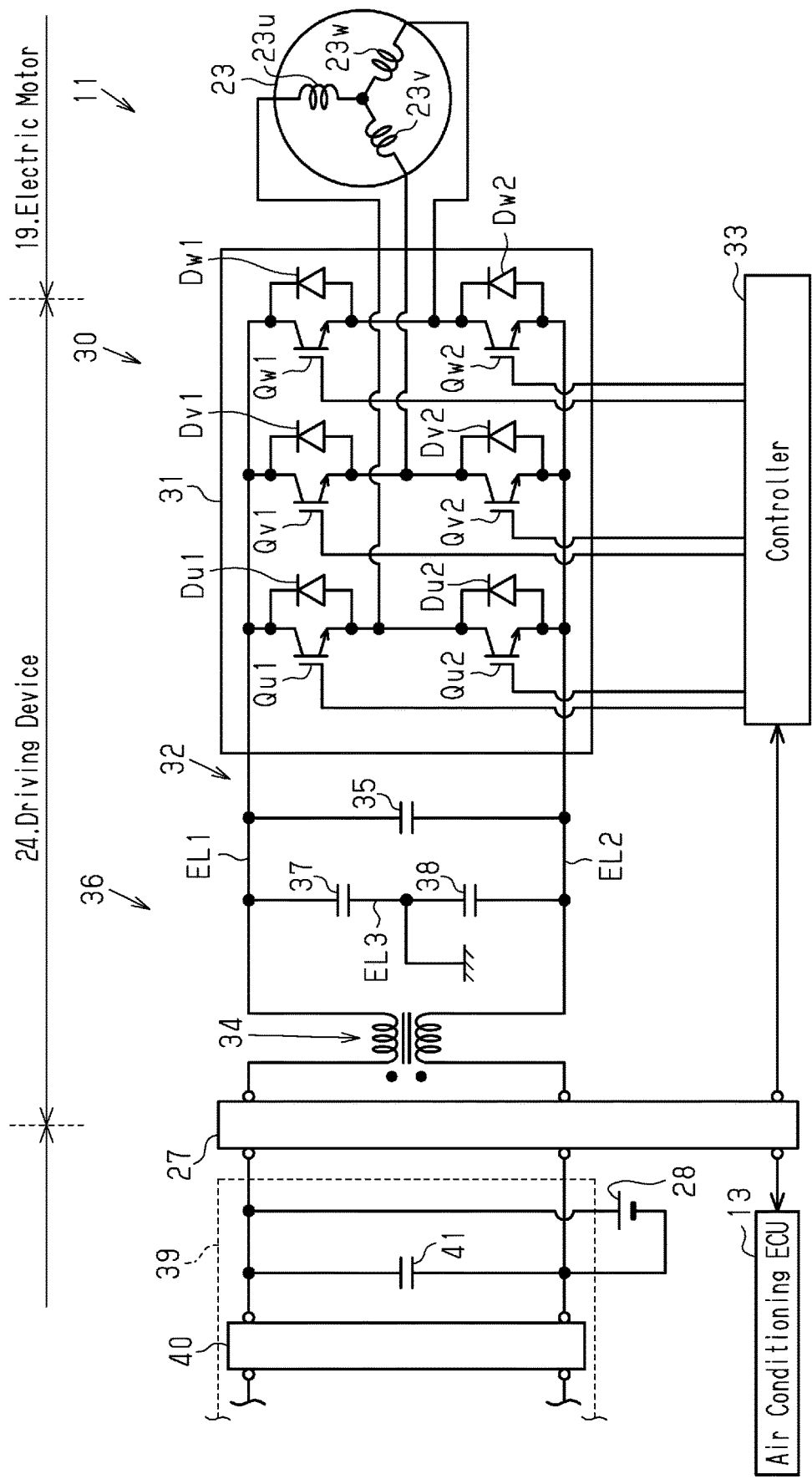
FIG. 2 is a circuit diagram of a driving device and an electric motor.

The circuit board 29 is flat. The circuit board 29 is located at a predetermined distance from the bottom wall 15a in the axial direction of the rotary shaft 17. The inverter device 30 drives the electric motor 19. As shown in FIG. 2, the inverter device 30 includes an inverter circuit 31 and a noise reducer 32. The inverter circuit 31 converts direct-current power into alternating-current power. The noise reducer 32 is arranged at the input side of the inverter circuit 31 and reduces the common mode noise and the normal mode noise included in the direct-current power before it is delivered to the inverter circuit 31.

The electrical configuration of the electric motor 19 and the driving device 24 will now be described.

As shown in FIG. 2, the coils 23 of the electric motor 19 are of a three-phase structure with a u-phase coil $23u$, a v-phase coil $23v$, and a w-phase coil $23w$. The coils $23u$ to $23w$ are connected in a Y connection.

The inverter circuit 31 includes u-phase switching elements Qu1, Qu2 corresponding to the u-phase coil $23u$, v-phase switching elements Qv1, Qv2 corresponding to the v-phase coil $23v$, and w-phase switching elements Qw1, Qw2 corresponding to the w-phase coil $23w$. Each of the switching elements Qu1 to Qw2 is a power switching element such as an insulated-gate bipolar transistor (IGBT). The switching elements Qu1 to Qw2 include freewheeling diodes (body diodes) Du1 to Dw2.

The u-phase switching elements Qu1, Qu2 are connected to each other in series by a connection wire that is connected to the u-phase coil $23u$. The serially-connected body of the u-phase switching elements Qu1 and Qu2 are electrically connected to the connection lines ELL EL2. The serial connection body receives direct-current power from the in-vehicle electric storage device 28.

Except for the connected coil, the other switching elements Qv1, Qv2, Qw1, Qw2 have the same connection structure as the u-phase switching elements Qu1, Qu2.

The driving device 24 includes a controller 33 that controls operation of the switching elements Qu1 to Qw2. The controller 33 is constructed, for example, by at least one dedicated hardware circuit and/or at least one processor (control circuits) that operates in accordance with a computer program (software). The processor includes a CPU and memories such as a RAM and ROM. The memories store program codes or instructions configured to cause the processor to execute various types of processes. The memory, or computer readable medium, includes any type of medium that is accessible by general-purpose computers and dedicated computers.

The controller 33 is electrically connected to the air conditioning ECU 13 via the connector 27. Based on commands from the air conditioning ECU 13, the controller 33 periodically turns the switching elements Qu1 to Qw2 on and off. Specifically, based on commands from the air conditioning ECU 13, the controller 33 performs pulse width modulation control (PWM control) on the switching elements Qu1 to Qw2. More specifically, the controller 33 uses a carrier signal and a commanded voltage value signal (signal for comparison) to generate control signals. The controller 33 executes ON-OFF control on the switching elements Qu1 to Qw2 by using the generated control signals, thereby converting the direct-current power into alternating-current power.

The noise reducer 32 has a common mode choke coil 34 and an X capacitor 35. The X capacitor 35, which is a smoothing capacitor, and the common mode choke coil 34 form a low pass filter circuit 36. The low pass filter circuit 36 is arranged on the connection lines EL1 and EL2. The low pass filter circuit 36 is arranged between the connector 27 and the inverter circuit 31 in terms of circuitry.

The common mode choke coil 34 is arranged on the connection lines EL1 and EL2. The X capacitor 35 is arranged on the output stage of the common mode choke coil 34 (closer to the inverter circuit 31). The X capacitor 35 is electrically connected to the connection lines EL1 and EL2. The common mode choke coil 34 and the X capacitor 35 form an LC resonance circuit. The low pass filter circuit 36 of the present embodiment is an LC resonance circuit including the common mode choke coil 34.

Y capacitors 37, 38 are connected in series. Specifically, the driving device 24 includes a bypass line EL3 that connects a first end of the first Y capacitor 37 and a first end of the second Y capacitor 38 to each other. The bypass line EL3 is grounded to the body of the vehicle.

The serially-connected body of the Y capacitors 37, 38 is arranged between the common mode choke coil 34 and the X capacitor 35 and is electrically connected to the common mode choke coil 34. A second end of the first Y capacitor 37 is connected to a portion of the first connection line EL1 that connects the first winding of the common mode choke coil 34 and the inverter circuit 31 to each other. A second end of the second Y capacitor 38 is connected to a portion of the second connection line EL2 that connects the second winding of the common mode choke coil 34 and the inverter circuit 31 to each other.

The vehicle includes, as an in-vehicle device, for example, a power control unit (PCU) 39, which is separate from the driving device 24. The PCU 39 uses direct-current power from the in-vehicle electric storage device 28 to drive the traveling motor mounted in the vehicle. In the present embodiment, the PCU 39 and the driving device 24 are connected in parallel to the in-vehicle electric storage device 28. The in-vehicle electric storage device 28 is shared by the PCU 39 and the driving device 24.

The PCU 39 includes a boost converter 40 and a power supply capacitor 41. The boost converter 40 includes a boost switching element and periodically turns the boost switching element on and off to boost the direct-current power of the in-vehicle electric storage device 28. The power supply capacitor 41 is connected in parallel to the in-vehicle electric storage device 28. Although not illustrated, the PCU 39 includes a vehicle-driving inverter that converts the direct-current power boosted by the boost converter 40 to drive power capable of driving the traveling motor.

In the above described configuration, noise generated by switching actions of the boost switching element flows into the driving device 24 as normal mode noise. In other words, the normal mode noise contains a noise component corresponding to the switching frequency of the boost switching element.

The configuration of the common mode choke coil 34 at an arrangement location, which serves as part of the driving device, will now be described with reference to FIGS. 3A, 3B, 4A, 4B, and 5. In the drawings, a three-axis orthogonal coordinate system is defined in which the axial direction of the rotary shaft 17 in FIG. 1 is defined as the Z direction, and the directions orthogonal to the Z direction are defined as the X and Y directions.

Figure 5:
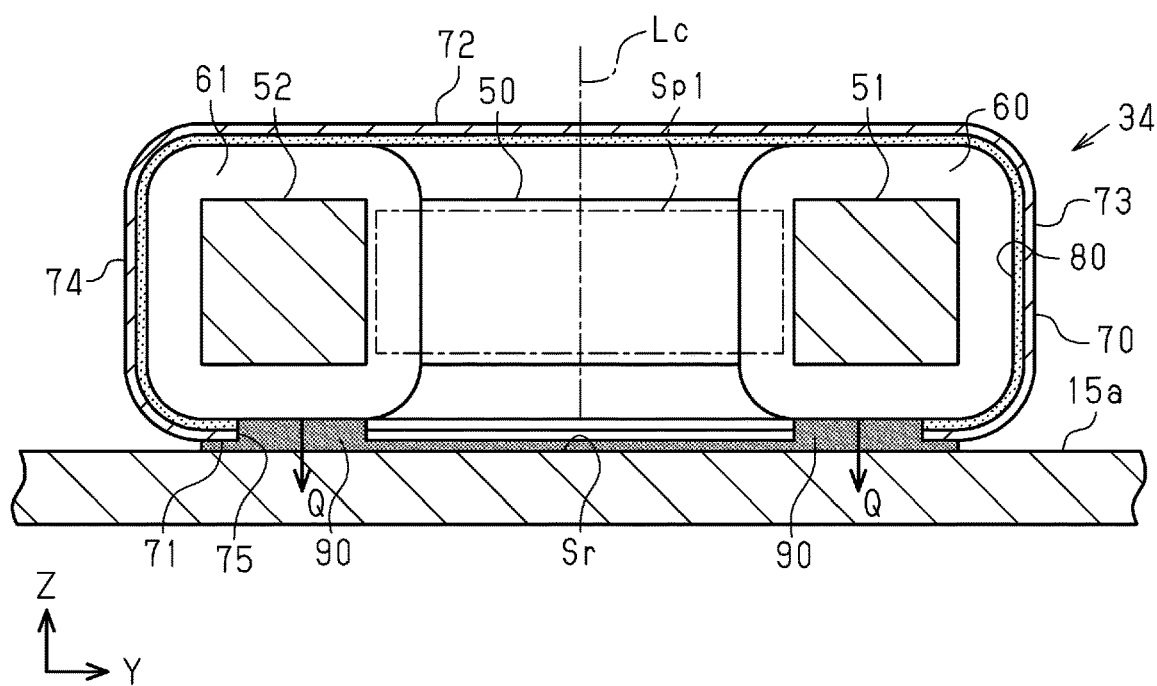
FIG. 5 is a cross-sectional view taken along line 5-5 in FIG. 3A.

The common mode choke coil 34 is mounted on the circuit board 29. The common mode choke coil 34 is thermally joined to the bottom wall 15a. Thus, as shown in FIG. 5, heat Q generated in the common mode choke coil 34 is transferred to the bottom wall 15a. Specifically, heat generated in a metal film 70 is transferred to the bottom wall 15a via thermal grease 90.

The common mode choke coil 34 is configured to limit transmission of high frequency noise generated in the PCU 39 at the vehicle side to the inverter circuit 31 on the compressor side. In particular, a normal mode inductance from leakage magnetic fluxes is used as the L component in the low pass filter circuit (LC filter) 36 that eliminates the normal mode noise (differential mode noise). That is, the common mode choke coil 34 is configured to reduce the common mode noise and the normal mode noise (differential mode noise). In the present embodiment, a single choke coil reduces the two mode noises without using a common mode choke coil and a normal mode (differential mode) choke coil respectively.

As shown in FIGS. 3A, 3B, 4A, 4B, and 5, the common mode choke coil 34 includes a loop-shaped core 50, a first winding 60, a second winding 61, and a metal film 70, which is a loop-shaped conductor.

Figure 3A:
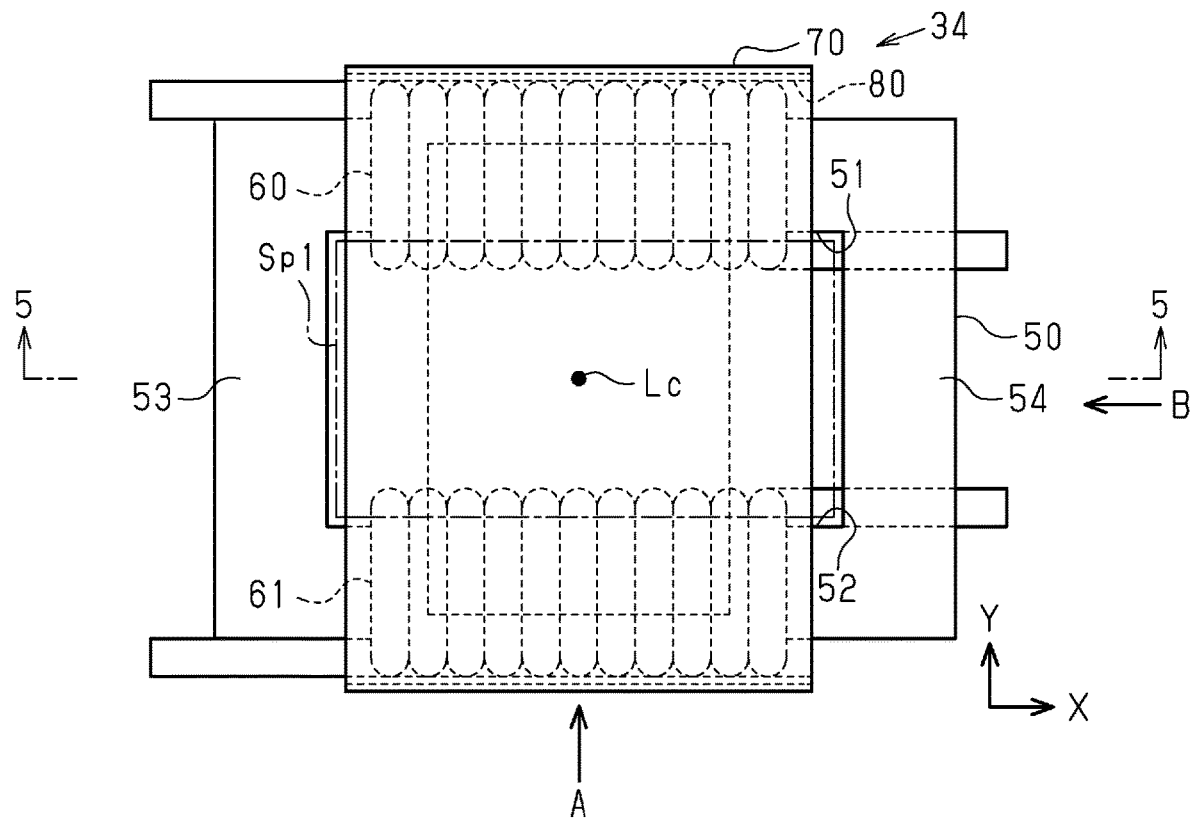
FIG. 3A is a plan view of the driving device.

The core 50 has a quadrangular cross section as shown in FIG. 5, and has a rectangular shape in its entirety in the X-Y plane. As shown in FIGS. 3A and 5, the core 50 has an inner space Sp1.

The first winding 60 and the second winding 61 are wound around the core 50. The core 50 is rectangular and has two long side portions. One long side portion forms a first linear part 51 and the other long side portion forms a second linear part 52. The first linear part 51 is arranged in parallel with the second linear part 52. That is, the core 50 has the first linear part 51 and the second linear part 52, which are arranged in parallel with each other and extended linearly. At least part of the first winding 60 is wound around the first linear part 51, and at least part of the second winding 61 is wound around the second linear part 52. The winding directions of the two windings 60, 61 are reverse to each other. Further, the first winding 60 and the second winding 61 are located away from each other while being opposed to each other at the opposite sides from central axis Lc of the core 50.

A plastic case (not shown) is provided between the core 50 and the windings 60 and 61. A projection (not shown) extends from the plastic case. The projection abuts the metal film 70 to restrict movement of the metal film 70. The metal film 70 is made of copper foil. That is, the metal film 70 is a loop-shaped conductor. The thickness of the metal film 70 is 10 µm to 100 µm. For example, the thickness of the metal film 70 may be 35 µm. The reason for thinning the metal film 70 is to increase resistance, when an induced current flows, and convert the current into heat. However, when the metal film 70 is thinned, it is difficult to maintain its strength and its original shape.

Figure 4A:
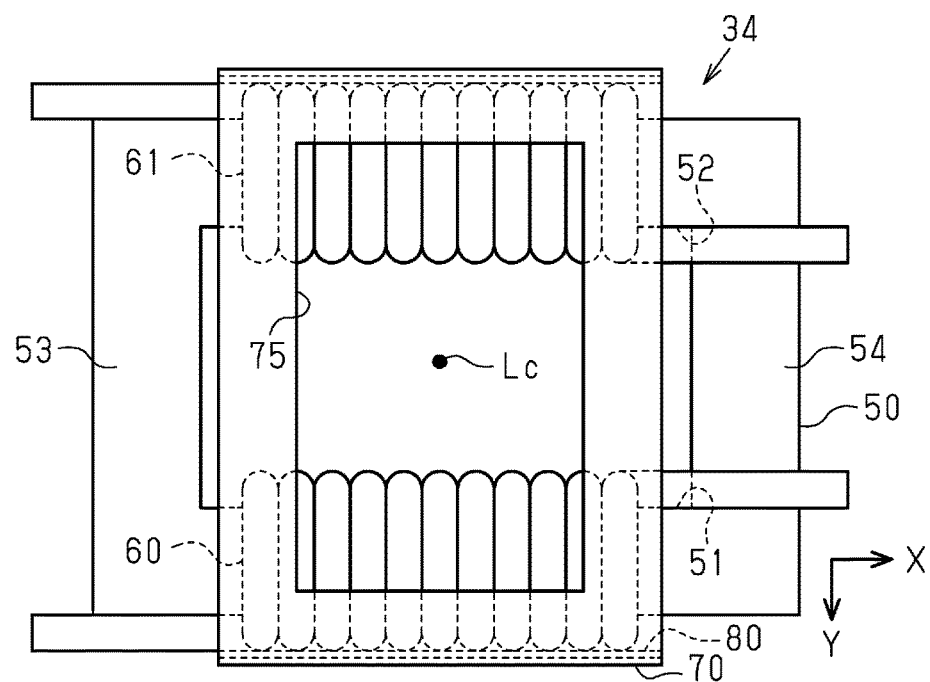
FIG. 4A is a bottom view of the driving device as viewed from direction C in FIG. 3B.
Figure 4B:
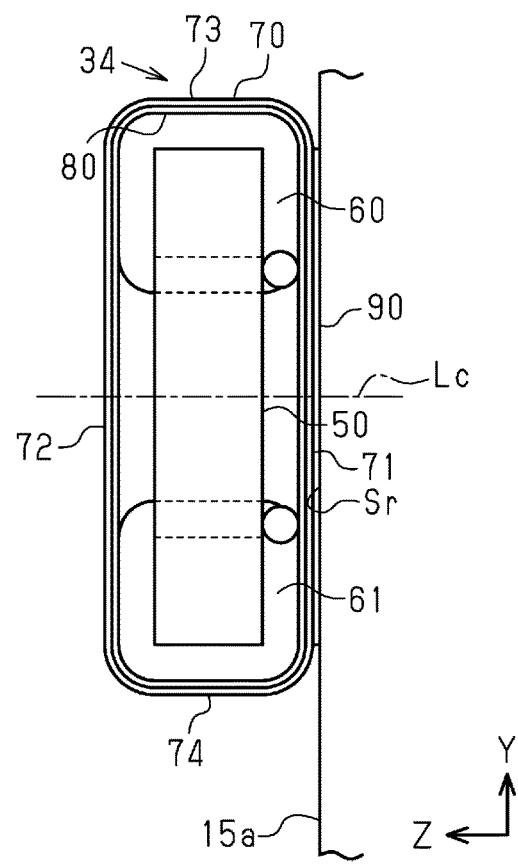
FIG. 4B is a side view of the driving device as viewed from direction B in FIG. 3A.

The metal film 70 is band-shaped and endless. The width of the metal film 70 is constant, and the thickness of the metal film 70 is constant. The metal film 70, which is rectangular loop-shaped, has a set of a first linear part 71 and a second linear part 72, which are opposed to each other, and a set of a third linear part 73 and a fourth linear part 74, which are opposed to each other, as shown in FIG. 4B. The first linear part 71 is opposed to the bottom wall 15a of the suction housing member 15. The first linear part 71 is a heat radiation portion in contact with the heat radiation surface Sr, which is the surface of the bottom wall 15a. The first linear part 71 is thermally coupled to the housing 14. The third linear part 73 and the fourth linear part 74 extend from the bottom wall 15a.

As shown in FIGS. 3A and 5, the metal film 70 covers the core 50 while extending over the first winding 60 and the second winding 61. Specifically, the metal film 70 is configured to entirely cover the first winding 60 and the second winding 61 and partly cover the inner space Sp1 of the core 50. In general, the metal film 70 is configured to cover at least part of the first winding 60, the second winding 61, and the inner space Sp1 of the core 50. The inner space Sp1 is defined between the first winding 60 and the second winding 61. The metal film 70 has portions that are opposed to each other and located away from each other between the first winding 60 and the second winding 61, that is, on opposite sides of the inner space Sp1.

As shown in FIGS. 4B and 5, the metal film 70 includes a plastic layer 80 formed between the inner surface of the metal film 70 and the outer surfaces of the first winding 60 and the second winding 61. The plastic layer 80 ensures insulation between the two windings 60, 61 and the metal film 70 as well as the strength and the high rigidity of the metal film 70. The plastic layer 80 is made of polyimide. The plastic layer 80 maintains the strength and the shape of the thin metal film 70. The thickness of the plastic layer 80 is, for example, 10 µm. This is because it is desirable that the two windings 60 and 61 and the metal film 70 be as close to each other as possible, and an induced current readily flows by receiving a magnetic field generated by the windings 60 and 61 at the metal film 70 when the two windings 60 and 61 are close to each other.

The metal film 70 and the plastic layer 80 are bonded together by an adhesive (not shown). The adhesive may be a thermosetting adhesive, a thermoplastic adhesive (hot-melt adhesive), or a pressure sensitive adhesive.

The metal film 70 may be formed as described below. First, a band-shaped metal film is prepared that has been integrated with a plastic layer by the same manufacturing method as a method for manufacturing a general flexible substrate. Then, the metal film is bent together with the plastic layer, and the opposite ends of the metal film are welded together to form the loop-shaped metal film 70. In this manner, it is easy to form the metal film 70 into a loop shape, which improves productivity.

Figure 3B:
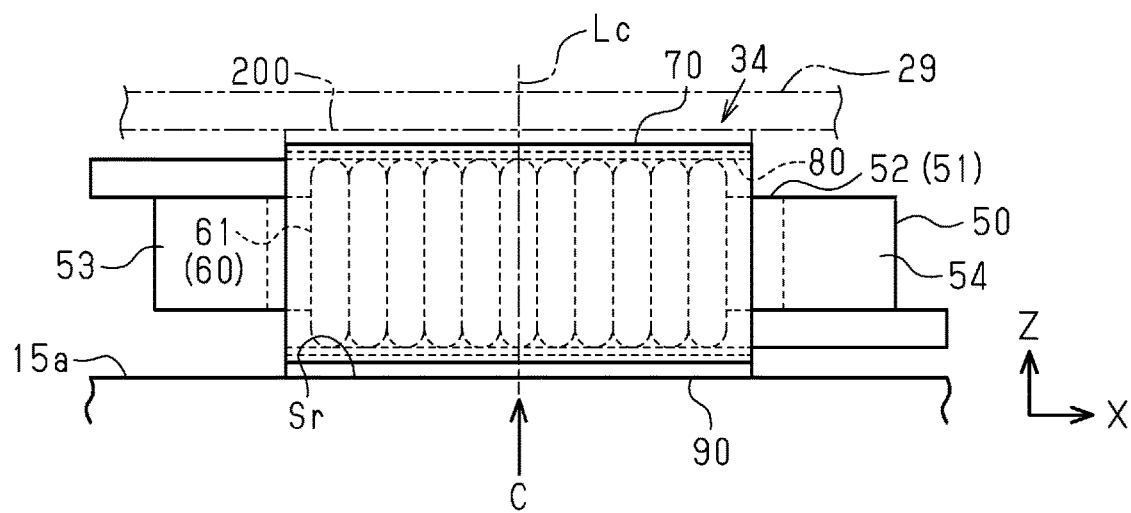
FIG. 3B is a front view of the driving device as viewed from direction A in FIG. 3A.

As shown in FIG. 3A, the core 50 includes exposed portions 53 and 54 that are not covered with the metal film 70. As shown in FIGS. 3B and 5, the thermal grease 90 is applied to the surface of the metal film 70 that is opposed to the bottom wall 15a of the suction housing member 15. Thus, the metal film 70 is thermally coupled to the suction housing member 15, namely, the housing 14 via the thermal grease 90.

Figure 6:
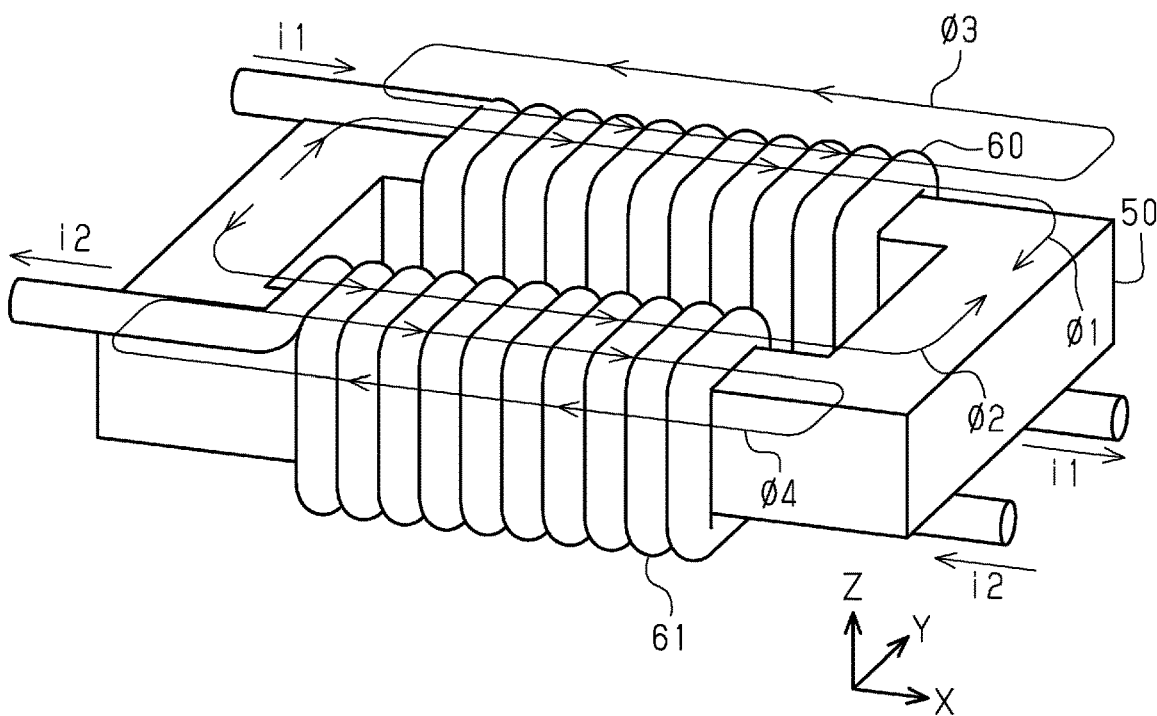
FIG. 6 is a perspective view of a core and windings.
Figure 7:
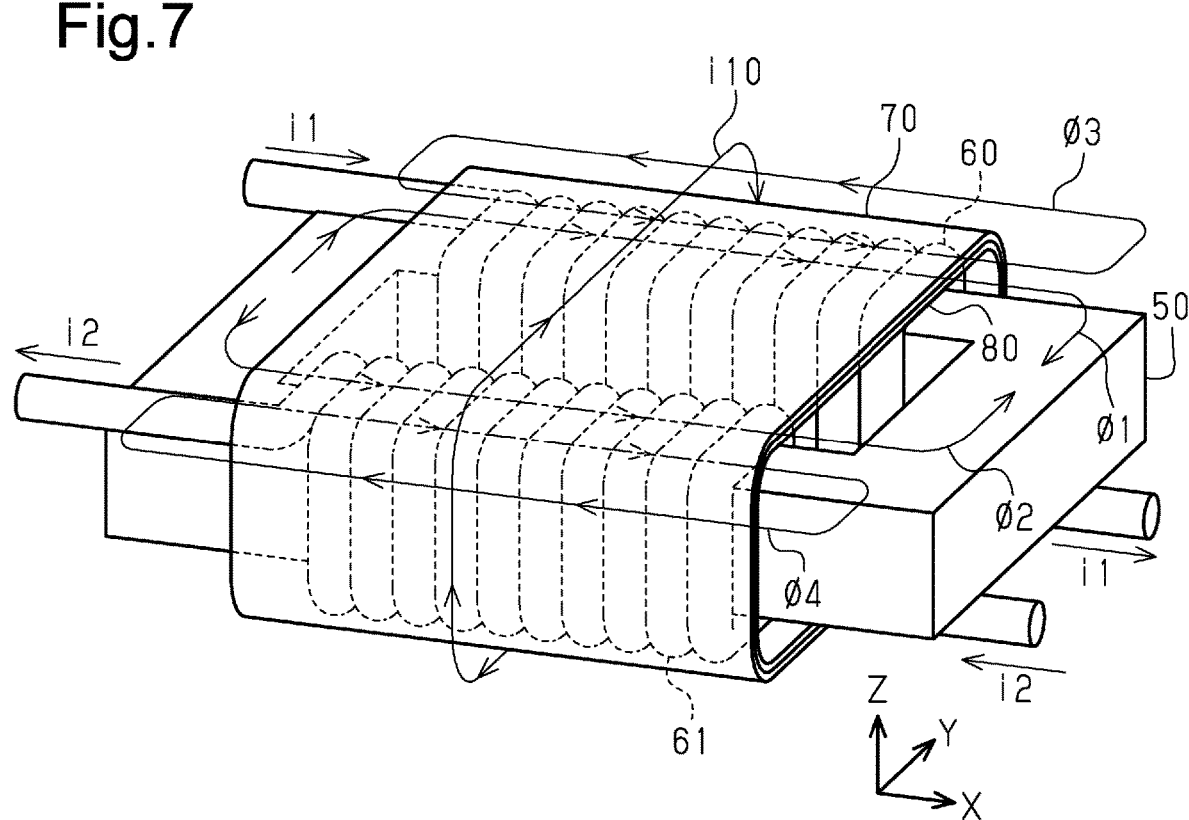
FIG. 7 is a perspective view of a common mode choke coil.

The normal mode (differential mode) will be described with reference to FIGS. 6 and 7. As shown in FIG. 6, currents i1 and i2 flow in the first winding 60 and the second winding 61 by energization. This generates magnetic fluxes $\varphi 1$, $\varphi 2$ in the core 50 and leakage magnetic fluxes $\varphi 3$, $\varphi 4$. The magnetic fluxes $\varphi 1$, $\varphi 2$ are mutually opposite magnetic fluxes. As shown in FIG. 7, an induced current i10 flows in the peripheral direction inside the metal film 70 so as to generate magnetic fluxes in the direction resisting the leakage magnetic fluxes $\varphi 3$, $\varphi 4$.

In this manner, an induced current (eddy current) HO flows in the peripheral direction of the metal film 70 so as to generate a magnetic flux in the direction resisting the leakage magnetic flux generated by the energization of the first winding 60 and the second winding 61. The induced current flowing in the peripheral direction refers to a current flow around the core 50.

In the common mode, currents flow in the same direction in the first winding 60 and the second winding 61 upon energization. This generates magnetic fluxes in the same direction in the core 50. During the energization in the common mode, a magnetic flux is generated inside the core 50 while almost no leakage magnetic flux is generated. This maintains common impedance.

If the common mode choke coil 34 does not have the metal film 70, the Q factor of the low pass filter circuit 36, specifically, the Q factor of the LC resonance circuit including the common mode choke coil 34 and the X capacitor 35, is high. Therefore, the normal mode noise of frequencies close to the resonance frequency of the low pass filter circuit 36 cannot be easily reduced. In contrast, in the present embodiment, the common mode choke coil 34 has the metal film 70 at a location where an eddy current is generated by magnetic fluxes (leakage magnetic fluxes $\varphi 3$, $\varphi 4$) generated in the common mode choke coil 34. The metal film 70 is arranged at the location that goes through the loops of the leakage magnetic fluxes $\varphi 3$, $\varphi 4$. That is, the metal film 70 is configured to generate an induced current that generates magnetic fluxes in a direction canceling out the leakage magnetic fluxes $\varphi 3$, $\varphi 4$. As a result, the metal film 70 functions to lower the Q factor of the low pass filter circuit 36. Thus, the normal mode noise having the frequencies near the resonance frequency of the low pass filter circuit 36 is also reduced by the low pass filter circuit 36.

In this manner, the present embodiment employs a metal shielding structure with the band-shaped and endless metal film 70 in the common mode choke coil. The common mode choke coil is used in the low pass filter circuit so that the common mode noise is reduced. Also, leakage magnetic fluxes generated with respect to a normal mode current (differential mode current) is exploited to obtain filtering performance suitable for reducing the normal mode noise (differential mode noise). That is, the use of the band-shaped and endless metal film 70 generates magnetic fluxes that resist the leakage magnetic fluxes generated during the energization with the normal mode current (differential mode current), and current flows and is consumed as heat in the metal film 70 by electromagnetic induction. Since the metal film 70 serves as a magnetic resistance, a damping effect is provided. This suppresses a resonance peak caused by the low pass filter circuit. During the energization in the common mode, a magnetic flux is generated inside the core while almost no leakage magnetic flux is generated. This maintains common impedance. Furthermore, by providing the plastic layer (polyimide layer) 80 at the inner peripheral side of the metal film (metal foil) 70, the shape of the metal film 70 is maintained and insulation between the metal film 70 and the windings 60, 61 is ensured.

Figure 8:
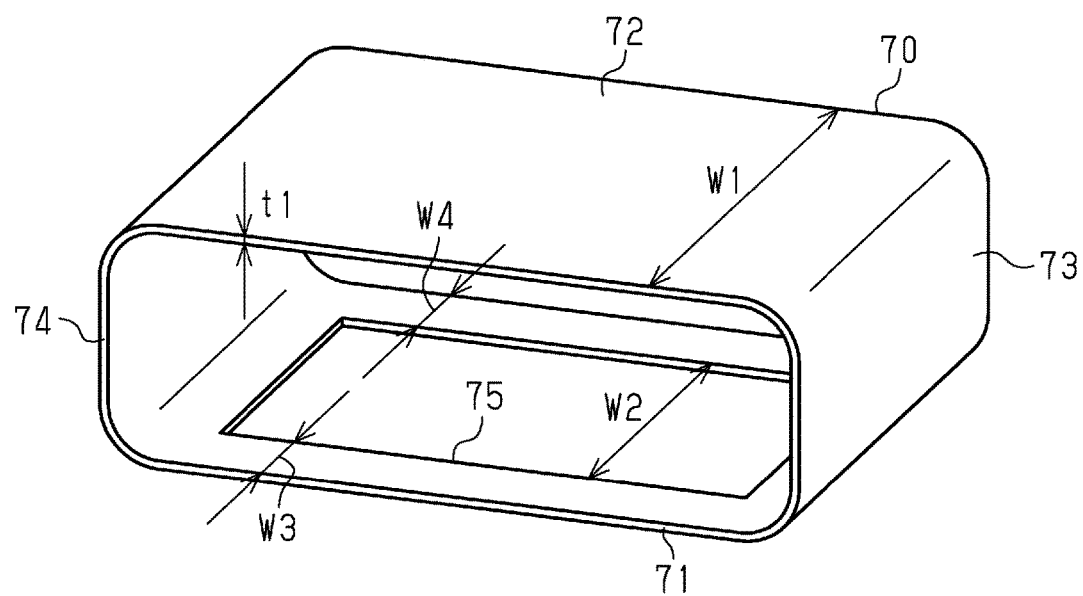
FIG. 8 is a perspective view showing a metal film.

When the circuit board 29 is arranged near the common mode choke coil 34, an insulating spacer 200 may be located between the common mode choke coil 34 and the circuit board 29 as shown by imaginary lines in FIG. 3B. As shown in FIG. 8, the first linear part 71, which is a portion of the metal film 70 in contact with the heat radiation surface Sr, includes a rectangular slit 75. The rectangular slit (through-hole) 75 is located at the central portion of the metal film 70 in the width direction. Two long sides of the slit 75 extend in parallel with each other in the longitudinal direction of the metal film 70, and two short sides of the slit 75 extend in parallel with each other in the width direction of the metal film 70. A range where the slit 75 is formed includes part of surfaces of the windings 60, 61 that face the heat radiation surface Sr as shown in FIGS. 4A and 5.

Figure 11:
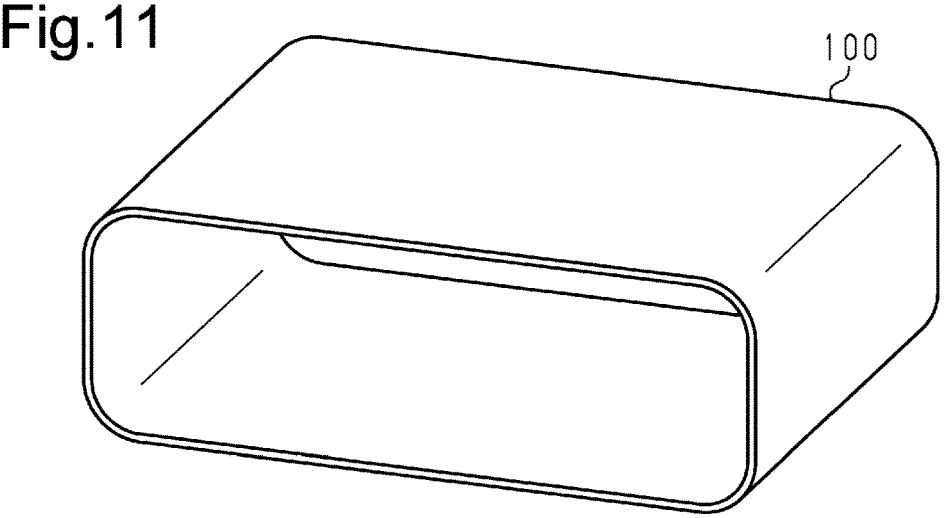
FIG. 11 is a perspective view showing a metal film for comparison.

As shown in FIG. 8, the width of the metal film 70 is W1, the thickness of the metal film 70 is t1, and the width of the slit 75 is W2. The width of a portion of the metal film 70 that extends along one of the long sides of the slit 75 is W3, and the width of a portion of the metal film 70 that extends along the other one of the long sides of the slit 75 is W4. In the metal film 70, the location of the first linear part 71 where the slit 75 is formed has a total cross-sectional area of W3×t1+W4×t1 in the longitudinal direction in which current flows. Locations other than the first linear part 71 have a total cross-sectional area of W1×t1 in the longitudinal direction in which current flows. Thus, the location of the first linear part 71 where the slit 75 is formed has a cross-sectional area that is less than a cross-sectional area of locations other than the first linear part 71. Electric resistance (resistance value Ω) increases as the cross-sectional area decreases. As a result, the average value of electric resistance per unit length in the peripheral direction of the first linear part 71, which is in contact with the heat radiation surface Sr, is greater than the average value of electric resistance per unit length in the peripheral direction of locations other than the first linear part 71. In this manner, the slit 75 formed in the metal film 70 narrows the path of current flowing in the peripheral direction of the metal film 70 and is more likely to raise the temperature higher than when a metal film 100 shown in FIG. 11 is used without a slit.

As shown in FIG. 5, the thermal grease 90 serving as a heat radiating resin material is applied inside the slit 75 that extends through the metal film 70 in the thickness direction. Thus, the surfaces of the windings 60, 61 that face the bottom wall 15a are thermally coupled to the bottom wall 15a via the thermal grease 90. In other words, the thermal grease 90 is applied inside the slit 75 so that the first winding 60, the second winding 61, and the first linear part 71 are thermally coupled to the suction housing member 15, that is, the housing 14 via the thermal grease 90.

Next, operation will be described.

Current flows inside the band-shaped and endless metal film 70 to generate magnetic fluxes in the direction resisting the leakage magnetic fluxes, and heat is generated as power is consumed.

As shown in FIG. 5, the metal film 70 is thermally joined with the bottom wall 15a so that heat Q generated in the common mode choke coil 34 is transferred to the bottom wall 15a. Since heat generated in the metal film 70 is transferred via the thermal grease 90, heat radiation performance for the heat radiation surface is improved.

A more specific description will be given below.

The common mode choke coil 34 is used for the inverter device 30 that drives the electric motor 19 in the in-vehicle motor-driven compressor 11. The windings 60, 61 of the common mode choke coil 34 are covered with the metal film 70 to achieve the damping effect, by which a normal mode current through the metal film 70 generates an induced current in the metal film 70, which is converted into thermal energy. The metal film 70 needs to have some electric resistance to have the damping effect. In this case, the metal film 70 generates heat.

As shown in FIG. 7, when an induced current i10 flows in the metal film 70, the metal film 70 generates heat, which raises the temperatures of the plastic layer 80 and the periphery of the metal film 70. This may cause the temperature to exceed the limitation of heat resistance of the plastic layer 80. This may also cause the temperature to exceed the limitations of heat resistance of a joining material for joining portions at the ends of the metal film 70 and solder that fixes the first winding 60 and the second winding 61 to the circuit board 29.

Usually, a structure that transfers the heat of the metal film 70 to the heat radiation surface Sr is effective. However, the layout of the circuit board 29 restricts portions where the metal film 70 and the heat radiation surface Sr are in contact with each other. Thus, portions of the metal film 70 that are located away from the heat radiation surface Sr, such as the second linear part 72 that is farthest from the bottom wall 15a of the suction housing member 15 in FIG. 4B, have a high temperature, which makes it difficult to lower the temperature of the entire metal film 70.

In the present embodiment, as shown in FIG. 8, the slit 75 is formed in the portion of the metal film 70 that is close to the heat radiation surface Sr. This provides a portion that has a small cross-sectional area in the peripheral direction. Thus, the portion where the slit 75 is formed has a small cross-sectional area for the path of current so that electric resistance increases in the current path and more heat is generated. By increasing heat generation in the first linear part 71, which has superior heat radiation performance in this manner, the portion of the metal film 70 that is close to the heat radiation surface Sr has a high temperature. Further, the amount of heat transfer from the common mode choke coil 34 to the heat radiation surface Sr depends on the difference of temperature of the boundary at which the common mode choke coil 34 and the heat radiation surface Sr are thermally in contact with each other. Thus, the amount of heat transfer increases as the temperature of the first linear part 71 rises. This efficiently transfers the heat of the metal film 70 to the heat radiation surface Sr and lowers the temperature of the entire metal film 70.

When a normal mode current flows, the temperatures of the windings 60, 61 rise so that the temperatures of the core 50 and the like in contact with the windings 60, 61 also rise. In an attempt to apply thermal grease 90 to the windings 60, 61 so as to transfer heat to the heat radiation surface Sr, thermal grease 90 cannot be applied to the windings 60, 61 because the metal film 70 covers the windings 60, 61. Thickening of the windings 60, 61 to lower electric resistance will increase the size of the windings 60, 61 so that such windings 60, 61 cannot be employed for an in-vehicle motor-driven compressor.

In the present embodiment, as shown in FIG. 5, the slit 75 is formed in the portion of the metal film 70 that is close to the heat radiation surface Sr and the thermal grease 90 is applied to the windings 60, 61 in order to improve heat radiation performance. This transfers heat Q to the heat radiation surface Sr via the thermal grease 90 applied inside the slit 75. The amount of heat transfer from the common mode choke coil 34 to the heat radiation surface Sr depends on the thermal conductivity of a material so that the thermal grease 90, which has good thermal conductivity, increases the amount of heat transfer. The heat radiation performance and the damping effect are provided without requiring a large space.

The above-described embodiment has the following advantages.

(1) The in-vehicle motor-driven compressor 11 includes the compression portion 18, the electric motor 19, the inverter device 30, and the housing 14. The inverter device 30 includes the inverter circuit 31 and the noise reducer 32. The noise reducer 32 has the common mode choke coil 34 and the X capacitor 35. The common mode choke coil 34 includes the loop-shaped core 50, the first winding 60, the second winding 61, and the metal film 70. The metal film 70 has portions that are opposed to each other and located away from each other between the first winding 60 and the second winding 61. The metal film 70 has the first linear part 71 that is thermally coupled to the suction housing member 15, namely, the housing 14. The average value of electric resistance per unit length in the peripheral direction of the first linear part 71 is greater than the average value of electric resistance per unit length in the peripheral direction of locations other than the first linear part 71.

The metal film 70 is loop-shaped to cover the core 50 while extending over the first winding 60 and the second winding 61. This is superior in the damping effect, by which a normal mode current through the metal film 70 generates an induced current in the metal film 70, which is converted into thermal energy. The directions of the leakage magnetic fluxes φ3, φ4, which are generated from the first winding 60 and the second winding 61, intersect with the peripheral cross section of the loop-shaped metal film 70. This allows an induced current to flow in the peripheral direction of the metal film 70. As a result, a normal mode choke coil can be omitted.

The metal film 70 is thermally coupled to the suction housing member 15, namely, the housing 14. Further, the average value of electric resistance per unit length in the peripheral direction of the first linear part 71, which is in contact with the heat radiation surface Sr, is greater than the average value of electric resistance per unit length in the peripheral direction of locations other than the first linear part 71. Thus, the portion of the metal film 70 that is close to the heat radiation surface Sr has a high temperature. Since the heat of the metal film 70 is efficiently transferred to the heat radiation surface Sr in accordance with a great difference in temperature from the suction housing member 15. This improves heat radiation performance for the heat radiation surface. This lowers the temperature of the entire metal film 70.

(2) The slit 75 formed in the first linear part 71 of the metal film 70 increases the average value of electric resistance per unit length in the peripheral direction. Thus, the portion of the metal film 70 that is close to the heat radiation surface Sr easily has a high temperature. The formation of the slit 75 in the metal film 70 having the same width and the same thickness is easy and practical in manufacturing.

(3) The thermal grease 90 is applied inside the slit 75 so that the first winding 60, the second winding 61, and the first linear part 71 are thermally coupled to the housing 14 via the thermal grease 90. This transfers heat Q, which is generated in the windings 60, 61, in addition to heat generated in the metal film 70, to the heat radiation surface Sr via the thermal grease 90 applied inside the slit 75.

(4) The plastic layer 80, which insulates the first winding 60 and the second winding 61, is formed on the inner surface of the metal film 70. That is, the plastic layer 80 is formed between the inner surface of the metal film 70 and the outer surfaces of the first winding 60 and the second winding 61. This maintains strength, improves rigidity, and ensures insulation even if the thickness of a conductor is reduced to increase resistance properties in a filter circuit with excellent heat radiation performance and damping effect.

The present embodiment may be modified as follows.

Figure 9:
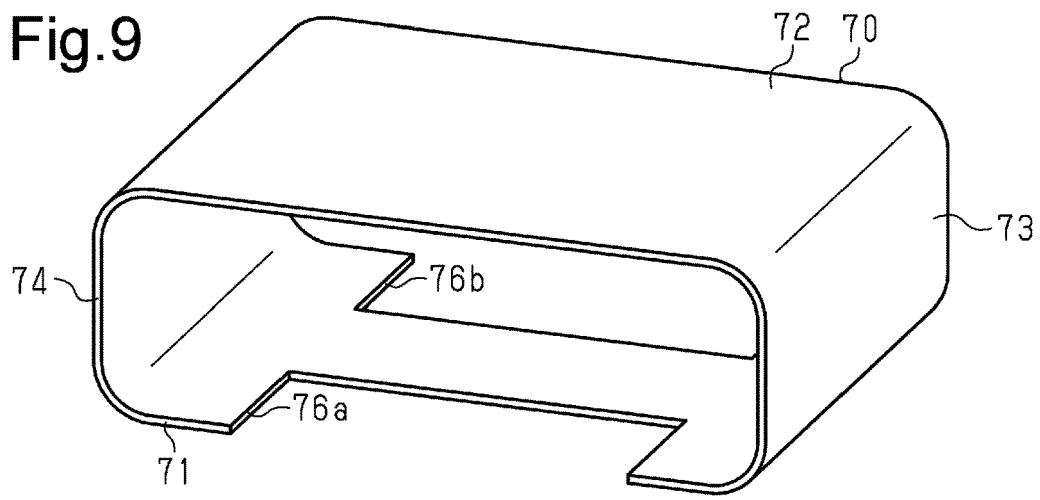
FIG. 9 is a perspective view showing a metal film in a modification.
Figure 10:
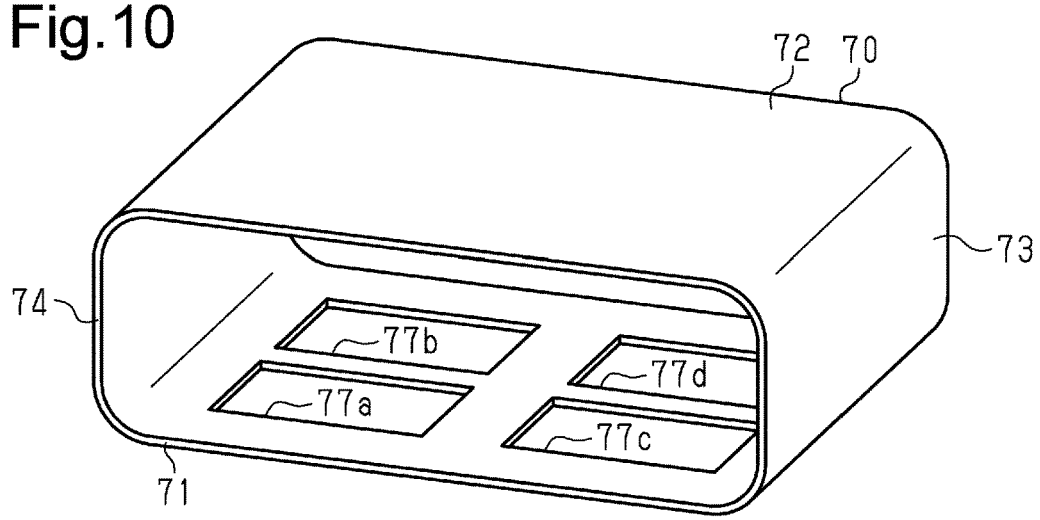
FIG. 10 is a perspective view showing a metal film in another modification.

As shown in FIG. 9, the metal film 70 may include two slits 76a, 76b that extend in parallel with each other. As shown in FIG. 10, the metal film 70 may include two slits 77a, 77b and two slits 77c, 77d that extend in parallel with each other. The slits 77a, 77b and the slits 77c, 77d may be arranged in the longitudinal direction of the metal film 70.

The slit 75 is formed in the heat radiation portion of the metal film 70 that is in contact with the heat radiation surface Sr. Instead, the heat radiation portion may be thinned. In other words, the cross-sectional area of the heat radiation portion may be reduced without forming the slit 75 in the metal film 70 with the same width and the same thickness.

The heat radiation portion of the metal film 70 that is in contact with the heat radiation surface Sr may be made of a material that has electric resistance greater than portions other than the heat radiation portion.

The thermal grease 90 may be replaced with a heat radiation sheet. In other words, a heat radiating resin material that has a great or superior thermal conductivity may be used.

In addition to copper foil, the metal film 70 may be made of an aluminum foil, a brass foil, a foil of a stainless steel, or the like. These nonmagnetic metals are easy to handle without magnetization or magnetic saturation. Further, the material is not limited to a nonmagnetic metal such as copper, but may be a magnetic metal such as iron.

The conductor covering the core 50 is not limited to a film as long as it is loop-shaped. The conductor may be a relatively thick plate.

In addition to polyimide, the plastic layer 80 may be made of polyester, PET, PEN, or the like.

Instead of the plastic layer 80, the thicknesses of insulating coatings of the first winding 60 and the second winding 61 may be increased to improve insulation.

Instead of the plastic layer 80, a different member may be used to support the metal film 70 without contacting the first winding 60 or the second winding 61. The core 50, for example, may be covered with a plastic case that has the same shape as the core 50. In this case, two arm members may be formed on the case so that the metal film 70 does not contact the first winding 60 or the second winding 61.

A metal base member, which serves as part of the housing, may be located between the bottom wall 15a and the first linear part 71.

The present invention may be applied to a motor-driven compressor that is not installed in a vehicle.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A motor-driven compressor comprising:
a compression portion that compresses fluid;
an electric motor that drives the compression portion;
an inverter device that drives the electric motor; and
a metal housing that accommodates the inverter device, wherein
the inverter device includes
an inverter circuit that converts direct-current power into alternating-current power, and
a noise reducer arranged at an input side of the inverter circuit, wherein the noise reducer reduces a common mode noise and a normal mode noise included in the direct-current power before delivered to the inverter circuit,
the noise reducer includes
a common mode choke coil, and
a smoothing capacitor that forms a low pass filter circuit together with the common mode choke coil,
the common mode choke coil includes
a loop-shaped core,
a first winding wound around the loop-shaped core,
a second winding wound around the loop-shaped core, wherein the second winding is located away from the first winding and opposite to the first winding, and
a loop-shaped conductor that covers the loop-shaped core while extending over the first winding and the second winding, wherein
the loop-shaped conductor has portions that are opposite to each other and located away from each other between the first winding and the second winding,
the loop-shaped conductor includes a heat radiation portion that is thermally coupled to the metal housing, and wherein
an average value of electric resistance per unit length in a peripheral direction of the heat radiation portion of the loop-shaped conductor is greater than an average value of electric resistance per unit length of locations other than the heat radiation portion.

2. The motor-driven compressor according to claim 1, comprising a slit formed in the heat radiation portion of the loop-shaped conductor so as to increase the average value of electric resistance per unit length in the peripheral direction.

3. The motor-driven compressor according to claim 2, comprising a heat radiating resin material provided inside the slit,
wherein the first winding, the second winding, and the heat radiation portion are thermally coupled to the metal housing via the heat radiating resin material.

4. The motor-driven compressor according to claim 1, comprising a plastic layer formed on an inner surface of the loop-shaped conductor, wherein the plastic layer ensures insulation between the first winding and the loop-shaped conductor and between the second winding and the loop-shaped conductor.

* * * * *